United States Patent [19]

Heshmatpour

[11] 4,410,358
[45] Oct. 18, 1983

[54] PLASMA RECOVERY OF TIN FROM SMELTER DUST

[75] Inventor: Bahman Heshmatpour, Woburn, Mass.

[73] Assignee: Thermo Electron Corporation, Waltham, Mass.

[21] Appl. No.: 449,116

[22] Filed: Dec. 13, 1982

[51] Int. Cl.³ .............................................. C22B 25/00
[52] U.S. Cl. ...................................... 75/10 R; 75/25; 75/85
[58] Field of Search ........................... 75/85, 10 R, 25

[56] References Cited

U.S. PATENT DOCUMENTS

| | | | |
|---|---|---|---|
| 3,123,465 | 9/1958 | Sunday et al. | 75/24 |
| 3,211,548 | 10/1965 | Scheller et al. | 75/84 |
| 3,475,158 | 10/1969 | Neuenschwander | 75/0.5 BB |
| 3,508,909 | 5/1970 | Davey et al. | 75/85 |
| 3,738,824 | 6/1973 | Davis et al. | 75/0.5 B |
| 3,756,804 | 9/1973 | Stevenson | 75/25 |
| 3,862,834 | 1/1975 | Von Waclawiczek et al. | 75/11 |
| 3,989,511 | 11/1976 | Fey et al. | 75/0.5 BB |
| 3,989,512 | 11/1976 | Sayce | 75/10 R |
| 4,013,456 | 3/1977 | Bergsoe | 75/77 |
| 4,236,916 | 12/1980 | Melcher et al. | 75/85 |
| 4,335,080 | 6/1982 | Davis et al. | 422/244 |

OTHER PUBLICATIONS

Mackey, Thomas S., and Bergsoe, Svend, "Flash Agglomeration of Flue Dust," *Journal of Metals*, Nov. 1977, pp. 1 to 4.

Primary Examiner—M. J. Andrews
Attorney, Agent, or Firm—Herbert E. Messenger

[57] ABSTRACT

Disclosed are a method and apparatus for recovering tin from tin smelter dust without the need for pre-agglomerating the dust particles. Dust containing tin oxides is directed into the tail flame of a plasma reactor, and the tin oxides are reduced to liquid tin using hydrogen and/or hydrocarbon gases supplied to the reactor as dust carrier and plasma gases. Tin is removed from a collection vessel at the bottom of the plasma reactor, preferably while in liquid form so that the recovery process may be run continuously. The plasma recovery process has demonstrated yields of about 94.5% and metal containing 99.7% tin, and analysis has indicated low operating costs relative to the current market price of tin.

13 Claims, 2 Drawing Figures

PLASMA RECOVERY OF TIN FROM SMELTER DUST

BACKGROUND OF THE INVENTION

This invention relates to recovery of tin from dust produced during tin smelting, and particularly to an efficient method of recovery utilizing a plasma reactor.

The smelting of tin-bearing ores in metallurgical furnaces generates large quantities of dust consisting largely of tin oxides (SnO and $SnO_2$). This flue dust or smelter dust is typically collected by filtration of hot gases leaving the furnace, then is stored or further processed for recovery of tin. Since the smelter dust may amount to up to about ten percent by weight of the ore feed material, long-term storage or disposal of the large quantities generated presents problems. Known techniques for reprocessing the flue dust, however, also are unsatisfactory. Because direct return of the dust to the smelting furnace would result in a large fraction of the dust being again carried off with furnace gases, current practice is to form the dust into pellets or briquettes and then charge these agglomerates into the furnace. This intermediate processing of the dust typically includes multiple steps such as mixing of the dust with water and chemical binders, then roasting and/or drying the mixture. Also, the resulting pellets often have low mechanical strength and partially crumble during storage or transportation, again yielding flue dust. Overall efficiency of recovery, therefore, may be less than fifty percent.

A more direct technique for processing smelter dusts consisting chiefly of metal oxides of low melting point is the so-called "flash agglomeration" method described in U.S. Pat. No. 4,013,456. In this process, flue dust from lead smelting furnaces is fused at relatively low temperatures, heated with additives, solidified by cooking, then fed to a furnace. This method, however, is not readily applicable to dust containing tin oxides since their melting points are considerably higher than those of lead oxides.

Accordingly, it is an object of the invention to provide an improved method of recovery of tin from dust produced during tin smelting.

It is a particular object of the invention to provide a method of recovering tin from smelter dust without prior agglomeration of the dust.

It is also an object of the invention to provide a method of recovering tin as a liquid from flue dust utilizing a single reactor operating at high yield and low cost.

SUMMARY OF THE INVENTION

The invention is an improved method of recovering tin from tin fines (smelter dust) produced during smelting of tin. In general terms, the improved method involves the generation of a plasma arc and high temperature plasma tail flame, feeding a mixture of flue dust and a carrier gas into the tail flame in a reactor tube so that tin oxide in the dust is heated and reduced to liquid tin in passing through the reactor tube, and then removing liquid tin from the reactor tube.

In a preferred process according to the invention, hydrogen is used as the plasma gas. The carrier gas is a reducing gas such as natural gas, hydrogen, or a mixture thereof so as to assist in reduction of tin oxide to liquid tin. A reactor tube having an inner wall of graphite is used to form a reaction zone, and a portion of this wall near the point of entry of the flue dust is shaped to converge in the downstream direction. Alternatively, the inner wall of the reactor tube first diverges then converges in approximate conformance with the shape of the plasma tail flame.

To facilitate removal of liquid tin produced in the recovery process, a collection vessel is positioned adjacent to the downstream end of the reactor tube. The tin may be withdrawn as liquid through a port in the side wall of the collection vessel, or it may be allowed to solidify and then be remelted to separate tin from slag in the tin product.

It is an important aspect of the recovery process that no agglomeration or other pre-treatment of the flue dust is necessary prior to its reduction in the plasma reactor. Also, the process can be run continuously, providing high yields of about 95%, and metal with a tin content of about 99.7%.

DETAILED DESCRIPTION OF PREFERRED EMBODIMENTS

Figure 1:
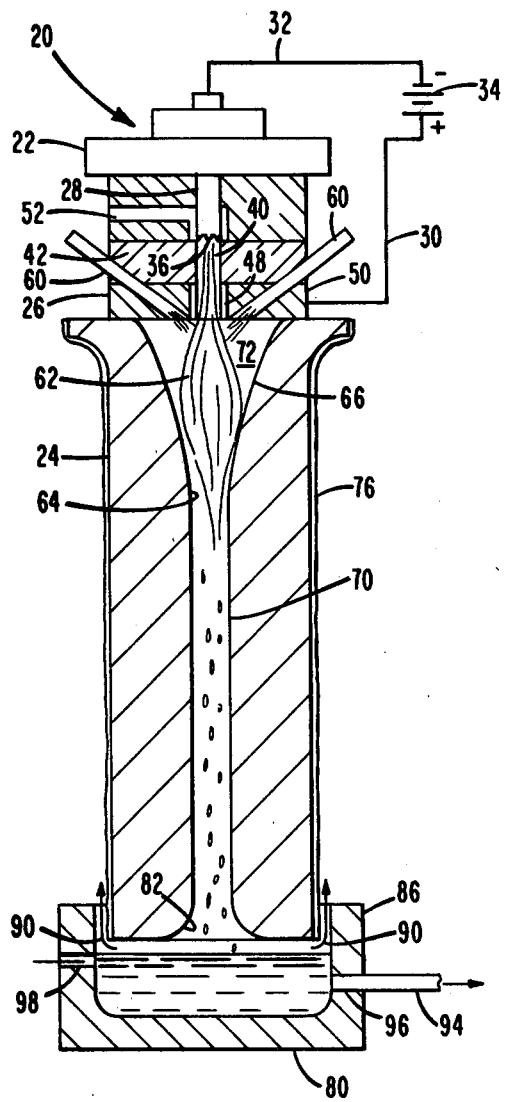
FIG. 1 is a side view, partly in cross-section, of a preferred apparatus for carrying out the invention.

In FIG. 1 there is shown a plasma reactor 20 suitable for processing tin dust according to the invention. The reactor 20 includes a plasma head 22 for generating a plasma arc and hot tail flame and a reactor tube 24 downstream of the plasma head 22 for receiving the tail flame and a flow of reactants.

The plasma head 20 of FIG. 1 may be of conventional construction and similar, for example, to the plasma reactor head of U.S. Pat. No. 4,335,080, of common assignee with the present invention and whose disclosure is incorporated herein by reference. The head 20 includes an anode 26 and a cathode 28 which are connected by electrical lines 30 and 32 to a D.C. power source 34 and which are cooled by suitable means (not shown) such as a coil through which water is circulated. A suitable cathode 28 is a copper rod having a tungsten tip 36 in its downstream end. The cathode 28 is positioned at one end of a central plasma arc passage 40 and is separated from the anode 26 by a spacer 42. A suitable anode is a copper ring 48 surrounding the downstream end of the passageway 40, the ring 48 in turn being contained within a block 50 of stainless steel.

To permit the production of plasma within the head 20, a plasma gas inlet duct 52 is provided to feed a plasma gas into the upstream end of the plasma arc passage 40. Hydrogen is preferred as a plasma gas in the recovery of tin from flue dust according to the process of the invention since it participates directly in the reduction of tin oxides (SnO and $SnO_2$) to tin (Sn) and is inexpensive and non-toxic. Many other gases which might be useful in other plasma processes have one or more characteristics which make them less preferred and in some cases undesirable for use in the present invention. For example, nitrogen, though inexpensive, would not contribute to the reduction of tin oxides and thus would lower efficiency of the process by diluting other reductants. Moreover, nitrogen as a plasma gas would produce $NO_x$ and possibly toxic cyanide gases in the reactor effluent. Hydrocarbon gases such as natural gas or methane, though available at low cost, are less preferable than hydrogen as plasma gases since they would tend to condense in the plasma head 20 and eventually interfere with arcing and flow through the head.

The lower portion of the plasma head 20 is intersected by one or more feed lines 60 through which flue dust is introduced into the reactor tube 24 and into the tail flame 62 discharged from the plasma arc passage 40 into the reactor tube 24. A carrier gas under pressure is used to direct the tin oxide-bearing flue dust through the lines 60 into the tail flame. The carrier gas preferably is a reductant such as natural gas, hydrogen, or a mixture thereof which participates in the reduction of tin oxides to tin. The use of a hydrocarbon for at least a portion of the carrier gas may be preferable to hydrogen alone since carbon's greater relative strength as a reductant should produce a higher yield of tin than would hydrogen alone.

As indicated in FIG. 1, the reactor tube 24 may comprise a substantially straight tube whose inner wall 64 includes a convergent section 66 near the upstream end of the tube 26 and a constant diameter section 70 over essentially the remaining portion of the tube. The converging section of the reaction chamber 72 formed by the wall 64 increases the flow velocity of the reactants, thus helping to avoid sticking of reactants and eventual plugging of the reaction chamber 72. It also concentrates the heat input provided by the tail flame 62, facilitating complete reduction of the tin oxides to tin with a moderate tube length and power input.

The reactor tube 24 may be constructed by any of various high temperature materials, such as graphite, alumina, zirconia, or tungsten carbide. Graphite is a preferred material which, in addition to high temperature resistance, has good thermal shock resistance, is relatively inexpensive, readily machineable, and non-reactive with tin. To minimize the loss of heat from the tube 24 and thus the power required to operate the plasma reactor 20, insulation 76 is provided around the outer wall of the tube 24. The insulation 76 may be formed of any suitable high temperature insulating material.

As indicated above, the flue dust or smelter dust from which tin is recovered according to the process of the invention consists largely of tin monoxide (SnO) and (in smaller amounts) tin dioxide ($SnO_2$). The dust typically has a tin content of about 60-72 percent by weight and may also contain metals such as tungsten, iron, zinc, aluminum, and calcium in the form of oxides, sulfides, and/or carbides, and may also contain non-metals such as silicon in the form of $SiO_2$.

During operation of the plasma reactor 20, this flue dust and a suitable gas are introduced into the tail flame 62 within the reaction chamber 72 to be heated to temperatures at which tin oxides are reduced to tin. It is considered important to the invention and the yields obtained thereby that the tin oxide reactants are in the form of small particles (dust) since this facilitates rapid heating in the very short residence time provided by the plasma reactor 20.

Reduction of the tin oxides occurs according to one or more of the following reactions, depending on the form(s) of tin present and on whether the carrier gas includes natural gas (considered to be essentially $CH_4$), hydrogen, or both:

$$SnO_{(s)} + H_{2(g)} \rightarrow Sn_{(l)} + H_2O_{(g)} \qquad (1)$$

$$4SnO_{(s)} + CH_{4(g)} \rightarrow CO_{2(g)} + 2H_2O_{(g)} + 4Sn_{(l)} \qquad (2)$$

$$SnO_{2(s)} + 2H_{2(g)} \rightarrow Sn_{(l)} + 2H_2O_{(g)} \qquad (3)$$

$$2SnO_{2(s)} + CH_{4(g)} \rightarrow 2Sn_{(l)} + CO_{2(g)} + 2H_2O_{(g)} \qquad (4)$$

where s, l, and g denote, respectively, solid, liquid, and gaseous states. Equations (1) and (2) show the reduction reactions for tin monoxide (SnO), the major constituent of the flue dust, and equations (3) and (4) show similar reactions for tin dioxide ($SnO_2$), which comprises a minor proportion of the flue dust.

The reduction reations proceed to completion as the reactants pass through the converging and then the constant diameter sections of the reaction chamber 72 so that the tin oxide in the smelter dust is converted to liquid tin in the reactor tube 24. Conversion to liquid tin may be essentially complete in approximately the upper half of the reactor tube 24, and for such operation the lower half of the tube 24 is merely maintained at a temperature sufficiently high that the tin remains a liquid as it falls through the lower portion of the chamber 72 and runs down the inner wall 64 of the tube 24. A collection vessel 80, which may also be formed of graphite, is positioned at the downstream end of the reactor tube 24 to receive liquid tin emerging from the tube outlet 82. Exhaust gases such as water vapor, carbon dioxide, and unreacted hydrogen and natural gas are directed out of the reactor system in any convenient manner such as by passing between the outer portion of the reactor tube 24 and a sidewall 86 of the vessel 80 as indicated by the arrows 90 shown in FIG. 1. The exhaust gases, which typically also contain a small amount of solid particles, are then preferably passed through a dust collector and scrubber (not shown).

Liquid tin from reduction of the tin monoxide is collected in the vessel 80, which if necessary may be heated by external means to maintain the tin in liquid form. Maintaining the tin as a liquid rather than allowing it to cool and solidify in the vessel 80 facilitates continuous operation of the method, which is preferred in order to efficiently process large quantities of dust. Continuous operation also avoids the need to remelt the solidified tin product to remove slag from it.

Liquid tin may be removed from the vessel by means of an outlet line 94 which extends through an opening 96 in the vessel sidewall 86. Withdrawal of tin from a position intermediate between the top and bottom of the pool of liquid tin product separates tin from slag produced in the plasma reactor 20. The slag, which is formed in quantities up to about 5 percent of the tin product and includes materials such as oxides of aluminum, calcium, and silicon, may, if the vessel 80 is maintained at a temperature sufficiently high that the slag remains molten, be periodically removed through a slag removal port 98.

After being withdrawn from the collection vessel 80, the liquid metal, which tests have shown contains up to about 99.7 percent tin, may be cast into ingots, and/or delivered to a location for further refining, or used directly such as in the preparation of alloys. The process is considered particularly useful when employed in a tin smelting plant. In such applications the liquid tin produced by the plasma reduction process of the invention is simply combined with the liquid tin output of a smelting furnace.

To begin operation, the plasma reactor 20 is started utilizing argon as the plasma gas. A few seconds after an arc is established, a flow of hydrogen gas is started and gradually increased while the flow of argon is steadily decreased so that hydrogen gradually replaces argon as the plasma gas. To maintain a stable plasma arc and tail flame, the argon flow preferably is not shut off completely, however, but instead a small flow of argon is maintained equal to about ½ to 1 percent by volume of the total plasma gas flow. Then, after the plasma arc and tail flame have stabilized and run for a period of time sufficient to heat the reactor tube 24 to operating temperatures—preferably a minimum temperature of about 1000° C. at the downstream or output end of the reactor tube—a feed of carrier gas and flue dust to the reactor tube 24 is started and tin oxides are reduced to liquid tin in the tube. During steady-state operation, the flow rate of plasma gas may, by way of example, be approximately three times the flow rate of carrier gas.

Figure 2:
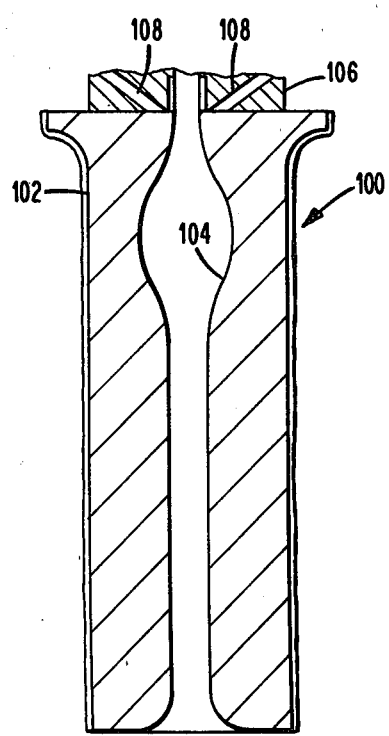
FIG. 2 is a side view, in cross-section, of a portion of a reactor tube according to an alternate embodiment of the invention.

FIG. 2 illustrates a lower portion of a plasma reactor 100 according to an alternate embodiment of the invention. The reactor tube 102 shown therein includes an inner wall 104 whose upper portion first diverges in the downstream direction and then converges to a constant diameter lower section. The divergent/convergent portion is shaped similar to an unconfined tail flame emerging from the plasma head 106 so that "dead zones" or areas of low gas velocity near the plasma head are avoided. This in turn minimizes any tendency for crust-like deposits to build up on the reactor tube inner wall 104 or the plasma head 106, which could embrittle the head and/or plug up outlet ports of the feed lines 108.

Practice of one embodiment of the invention is illustrated by the following tests conducted to demonstrate feasibility of the process for recovering tin from smelter dust. A plasma reactor was provided similar to the reactor 20 shown in FIG. 1, though lacking the outlet line 94 and the slag removal port 98. The reactor included a water-cooled plasma head having a tungsten-tipped copper cathode and an anode comprising a disk-shaped copper ring surrounded by a stainless steel block. The anode and cathode were separated from each other by a teflon spacer and were connected to a D.C. power source having an available power rating of 85-90 KW. The plasma head had a single feed tube extending therethrough to direct flue dust and carrier gas into a reaction chamber at approximately a 45-degree angle with respect to the vertically-oriented reaction chamber 72. The reactor tube below the plasma head comprised a cylindrical tube of graphite having an outer diameter of about 5 inches and a length of about 30 inches and wrapped with layers of graphite felt insulation. The tube also had, in approximate dimensions, an inner diameter of 3½ inches at its upstream end adjacent to the plasma head, tapering to an inner diameter of 2 inches in the first 5 inches of length and remaining at this diameter over its remaining length. A graphite receptacle was used as a collection vessel, and in the tests liquid tin product was allowed to solidify in the vessel. After each test run the vessel was removed and the product remelted to separate tin from slag.

Approximately one hundred pounds of tin smelter dust was obtained for testing of the above-described embodiment of the invention. Analysis of a random sample of the powder revealed a tin content of 72.0 percent by weight. The sample also contained the following percentages of other metals—tungsten (3.0), iron (0.7), zinc (0.4), aluminum (0.2), and calcium (0.1).

Various parameters and results of three test runs are set forth in Table 1.

The data on tin yield of Table 1 (Run No. 3) shows that a recovery of 94.5 percent of the tin present in smelter dust was achieved using the process of the invention. The yield computation included an assumption that tin content of the dust was 72.0 percent, i.e., the value measured in the random sample analyzed, and the amount of dust processed was based on the weighed amount consumed by the plasma reactor rather than being determined from the approximate dust feed rate and run length set forth in Table 1.

TABLE 1

| Run No. | 1 | 2 | 3 |
|---|---|---|---|
| Plasma gas | hydrogen* | hydrogen* | hydrogen* |
| Plasma gas flow rate (SCFH) | 300 | 300 | 300 |
| Plasma gas pressure (psi) | 40 | 40 | 40 |
| Carrier gas | hydrogen | hydrogen & natural gas** | hydrogen |
| Carrier gas pressure (psi) | 5 | 5 | 5 |
| Carrier gas feed rate (SCFH) | 100 | 100 | 100 |
| Dust feed rate (lb/hr) | 10 | 12 | 20 |
| Reactor power rating (KW) | 85 | 90 | 87 |
| Length of run (min) | 30 | 30 | 30 |
| Weight of product ingot (lb) | 2.5 | 3.5 | 6 |
| Tin content of product ingot (% by weight) | 99.4 | 99.7 | 99.5 |
| Yield of tin (% by weight) | NM*** | NM*** | 94.8 |

*A small amount of argon (about ½-1%) was included as stabilizer gas
**In approximately equal volumes
***NM = not measured precisely (but yields were high)

In the test runs no fluxing agents were added to the feed (dust). However, it is considered within the scope of the invention and desirable in commercial practice that small amounts of fluxing agents such as lime, borosilicate glass, or calcium fluoride be added to the flue dust to facilitate separation of slag from tin in the products of the plasma reaction process and to increase tin yield. Also, in an actual large scale recovery process it is desirable that slag be recycled into a smelting furnace and scrubber dust recycled into the plasma reactor or the furnace, which should also increase overall recovery of tin.

Table 1 also shows that after separation of slag from the tin product of the plasma reactor, tin content of the resulting ingot was as high as 99.7 percent (Run No. 2). Thus the tin recovered utilizing the method of the invention is of a purity sufficient for certain uses without further refining, and is equal or better in purity than tin produced in some typical smelting furnaces. Additional details of the results of the chemical analysis of the ingot of Run No. 1 are given in Table 2, which shows the major constituents of the remaining 0.6 percent of the ingot to be lead and iron.

TABLE 2

| Element | Percent (by weight) |
|---|---|
| Sn | 99.4 |
| Fe | 0.055 |
| Si | <0.001 |
| Sb | <0.01 |
| Mg | <0.001 |
| Pb | 0.45 |
| In | 0.005 |

TABLE 2-continued

| Element | Percent (by weight) |
| --- | --- |
| Ni | 0.010 |
| Bi | 0.002 |
| Al | <0.001 |
| Cu | 0.015 |
| Ag | <0.001 |

Analysis of the slag separated from the tin product in Run No. 1 revealed a tungsten content of 14.2 percent as compared with a tungsten content of about 3 percent in the smelter dust. The process of the invention thus can be used not only in recovering tin but also in recovering tungsten as a by-product.

In addition to providing high yields of good quality tin from smelter dust as demonstrated by the above-described test results, the process of the invention can effect this recovery at a cost quite attractive compared to the cost of tin. For example, for a plasma reactor system employing the disclosed process and of a size sufficient to recover 150 lbs. of tin per hour, energy and material (hydrogen and argon) costs of the process are conservatively estimated as only five to seven percent of present market price of tin (over five U.S. dollars per pound).

Accordingly, there has been described an improved method of recovering tin from tin smelter dust wherein tin monoxide is reduced to liquid tin in a plasma reactor. The method avoids any need for pelletizing or other preparation of the smelter dust prior to introduction of the dust into the reactor, provides high yields of metal containing up to about 99.7% tin, is readily usable as a continuous process, and permits recovery at operational costs far below current market prices for tin.

What is claimed is:

1. A method of recovering tin from dust produced during tin smelting, said dust containing tin oxides as the principal constituent, without pre-agglomerating the dust, comprising the steps of:
   providing a plasma reactor including a plasma head and a reactor tube adjacent to said plasma head;
   introducing a stream of plasma gas into said plasma head and ionizing said gas to produce a plasma arc whose tail flame is directed into said reactor tube;
   feeding a mixture of said dust and a reducing carrier gas into said reactor tube at a location near the downstream end of said plasma head such that said dust contacts the tail flame of said plasma arc and tin oxides in said dust are heated and reduced to liquid tin in passing through said reactor tube; and
   removing said liquid tin from said reactor tube.

2. A method as in claim 1 wherein said plasma gas consists essentially of hydrogen and up to about one percent of an inert stabilizing gas.

3. A method as in claim 2 wherein said stabilizing gas is argon.

4. A method of recovering tin as in claim 1 wherein said carrier gas is a hydrocarbon gas selected from the group consisting of natural gas, hydrogen, and mixtures thereof.

5. A method of recovering tin as in claim 1 including, following said removal step, collecting the solid and liquid products of reaction between said dust and said gases in a vessel positioned at the bottom of said reactor tube, and withdrawing liquid tin through a tin removal port in the side of said vessel.

6. A method as in claim 4 wherein said reactor tube is maintained at a minimum temperature of about 1000° C.

7. A method as in claim 1 wherein the ratio of the flow rate of hydrogen gas into the plasma head and the flow rate of said carrier gas into the reactor tube is about 3.

8. A method as in claim 5 further including periodically removing slag through a slag removal port located above said tin removal port in the side of said vessel.

9. A method as in claim 5 including, following withdrawal of liquid tin from said reactor tube, combining said liquid tin with liquid tin produced by a smelting furnace.

10. A method as in claim 1 wherein said mixture, after being fed into said reactor tube, is directed through a portion of said reactor tube whose inner wall converges in a downstream direction.

11. A method as in claim 1 wherein said mixture, after being fed into said reactor tube, is directed through a portion of said reactor tube whose inner wall first diverges and then converges in a downstream direction, said inner wall having a shape approximating that of an unconfined tail flame of a plasma arc.

12. A method of continuously recovering high purity tin from tin smelter dust containing tin monoxide as the principal constituent without pre-agglomerating the dust, comprising the steps of:
   providing a plasma reactor including a plasma head and a reactor tube adjacent to said plasma head;
   introducing a stream of hydrogen gas and a small amount of an inert stabilizing gas into said plasma head and ionizing said hydrogen gas to produce a plasma arc whose tail flame is directed into said reactor tube;
   feeding a mixture of said dust and a reducing carrier gas into said reactor tube at a location near the downstream end of said plasma head such that said dust contacts the tail flame of said plasma arc and tin monoxide and tin dioxide in said dust are heated and reduced to liquid tin in passing through said reactor tube;
   collecting the solid and liquid products of reaction between said dust and said gases in a vessel positioned at the bottom of said reactor tube;
   withdrawing liquid tin through a tin removal port in the side of said vessel; and
   periodically removing slag through a slag removal port located above said tin removal port in the side of said vessel.

13. A method as in claim 12 wherein said reducing carrier gas is selected from the group consisting of natural gas, hydrogen, and mixtures thereof.

* * * * *